April 9, 1940.   W. H. MARSH   2,196,931
FLUID FLOW MECHANISM
Filed June 21, 1937   2 Sheets-Sheet 1

INVENTOR
WALTER H. MARSH.
BY
ATTORNEY

April 9, 1940.                W. H. MARSH                 2,196,931
                           FLUID FLOW MECHANISM
                           Filed June 21, 1937           2 Sheets-Sheet 2
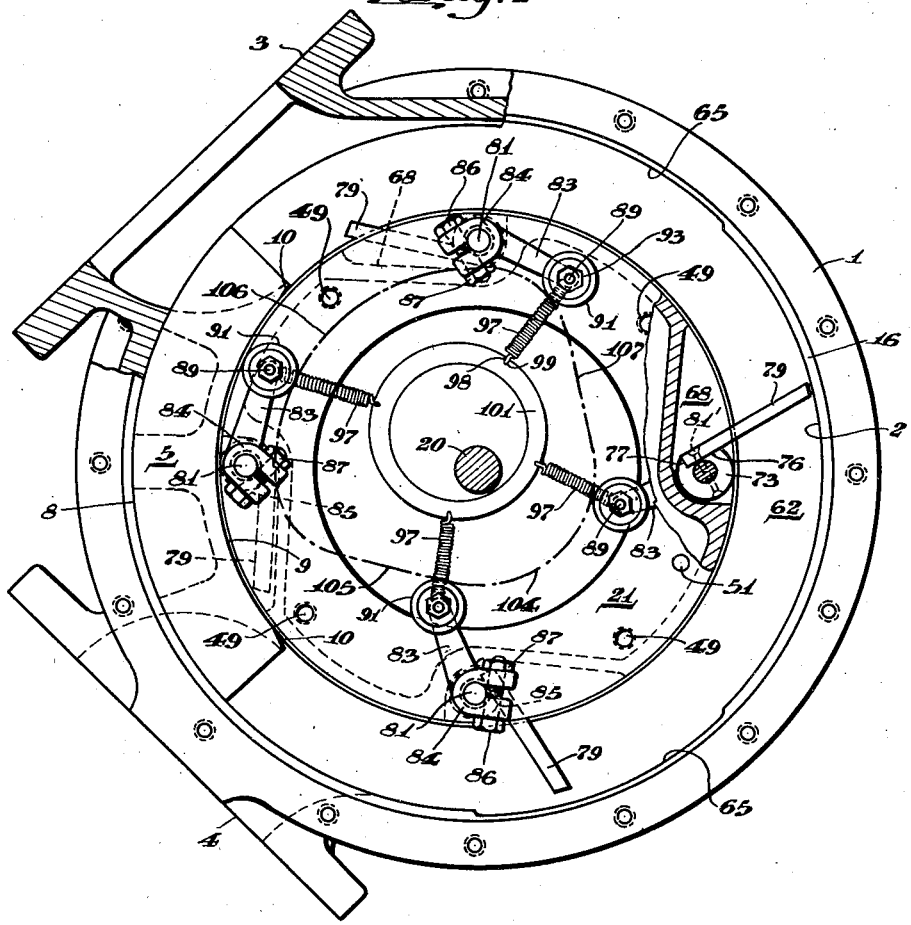
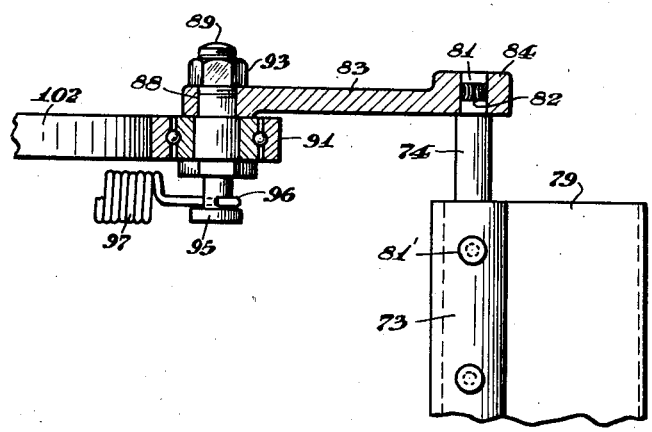
INVENTOR
WALTER H. MARSH.
BY
ATTORNEY Patented Apr. 9, 1940

2,196,931

UNITED STATES PATENT OFFICE 2,196,931

FLUID FLOW MECHANISM

Walter H. Marsh, Crafton, Pa., assignor to Pittsburgh Equitable Meter Company, Pittsburgh, Pa., a corporation of Pennsylvania Application June 21, 1937, Serial No. 149,529

5 Claims. (Cl. 73—260)

The present invention relates to fluid flow mechanisms particularly applicable to fluid meters and will be described in connection therewith, although it is to be understood that the invention is not limited thereto.

It is an object of the present invention to provide a rotary fluid meter having impeller members which are capable of yielding movement so as to pass over an obstruction in the meter chamber.

A further object of the invention is the provision of a rotary fluid meter having a relatively low pressure loss at high or low rates of flow, and which has a high capacity.

A further object of the invention is the provision of a rotary meter in which the impeller members are yieldingly secured together and the yielding force is substantially centralized and equally distributed.

Still another object is the provision of a rotary meter in which each impeller blade may be individually adjusted to provide a running clearance with the walls of the measuring chamber.

Still a further object is the provision of a rotary meter wherein a guiding means limits outward movement of the blade and provides for yielding return movement so that the blade may ride over an obstruction in the fluid passageway.

Still another object is the provision of a rotary meter having a rotor supported in predetermined spaced relation with the meter chamber and carrying pivoted vanes thereon.

According to the present invention a rotary meter is provided comprising a casing with a substantially cylindrical wall and a rotor secured in said casing spaced therefrom to provide a measuring chamber, and carrying blades thereon, the blades being guided to pivotally move outward into the measuring chamber and back to retracted position as the rotor rotates. The rotor may be located concentric with the meter chamber, in which case a suitable division plate is provided between the meter inlet and outlet, the division plate providing a running clearance with the rotor and/or the blades in retracted position so as to eliminate frictional resistance to turning. Preferably the rotor and the blades are separated from the casing walls by predetermined running clearances so as to eliminate excessive frictional resistance to turning, and outward movement of the blades is limited so that in the outermost position their ends provide predetermined running clearances with the cylindrical measuring chamber wall. The inward and outward movement of the blades preferably is caused by a cam secured in relatively fixed position and properly shaped for this purpose to cause the vanes to move inwardly and outwardly in proper sequence as the rotor rotates, and the vanes have guide rollers associated therewith which abut the cam. The rollers are held yieldingly in engagement with the cam by a spring or other suitable means and the yielding force is distributed or equalized among the blades so as to obtain a uniform action.

The invention will be described in greater detail in the following description taken in connection with the accompanying drawing wherein I have shown a preferred modification of the invention by way of example, and wherein:

Figure 2 is a plan view of Figure 1 with certain parts broken away,

Figure 3 shows a detail of the blade control means, and

Figure 1:
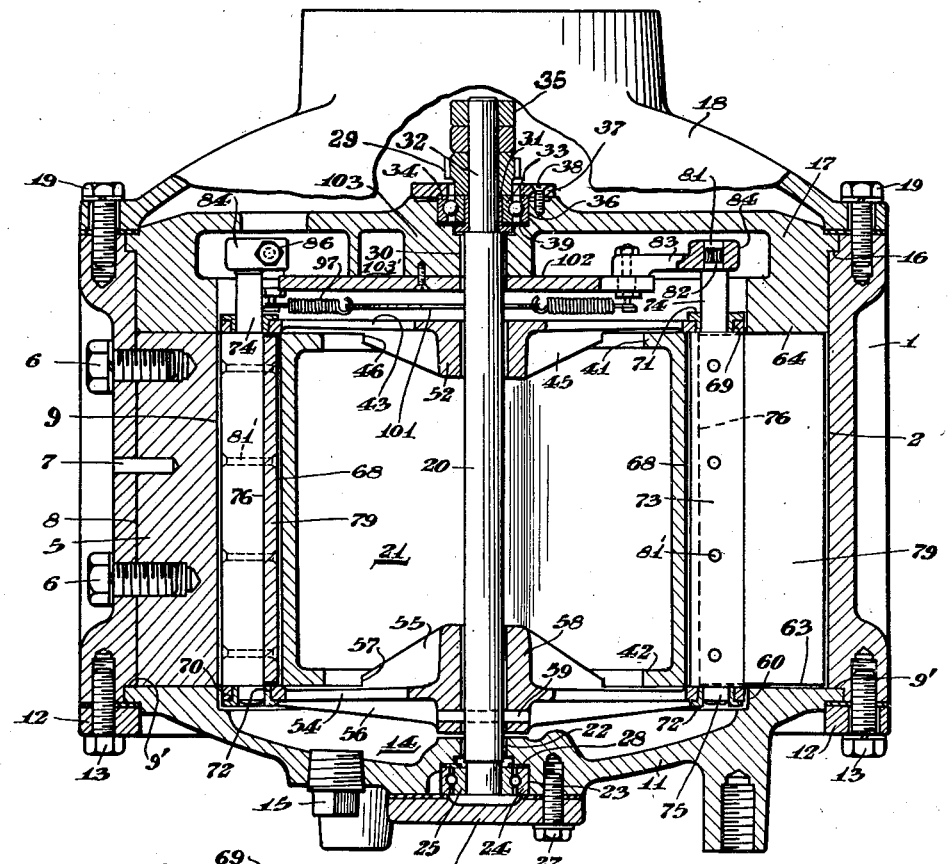
Figure 1 is a view partially in vertical section of a preferred modification.
Figure 4:
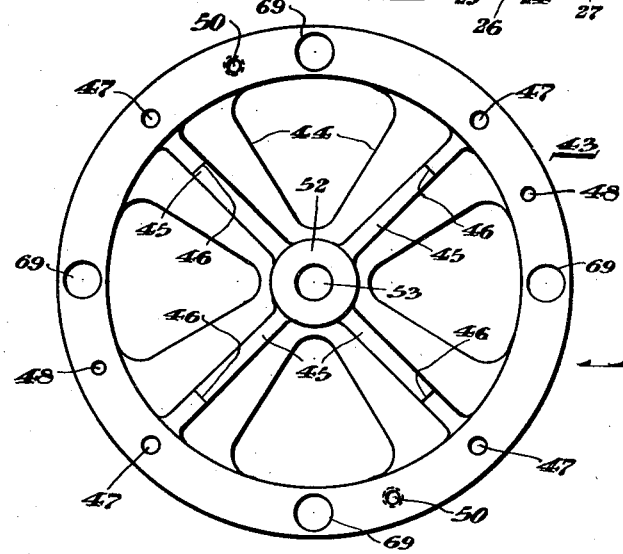
Figure 4 is a bottom view of the top rotor cover.

Referring to the drawings, the meter comprises a cylindrical casing 1 having an inner cylindrical wall 2 and inlet and outlet connections 3 and 4 respectively communicating with the interior of the casng. A segmental division plate 5 is secured within the casing against wall 2 between the inlet and outlet openings in any suitable manner, as by bolts 6 and a locating dowel 7, one face 8 being substantially coincident with the cylindrical wall 2, and the other face 9 being substantially concentric therewith, the ends of the face 9 being chamfered as indicated at 10. The bottom of the casing 1 is counterbored to provide a shoulder 9' and is closed by a bottom plate 11 resting on the shoulder 9' and held in position by a retaining ring 12 bolted thereto by bolts 13. A sump 14 is provided in the bottom cover and is normally closed by a threaded drain plug 15. The casing 1 at its top has a similar internal shoulder 16 upon which is seated a top bearing plate 17 which preferably is held in place by a top outer cover 18 bolted to the casing by bolts 19 or otherwise secured thereto.

A central shaft 20 is journalled in the bottom cover 11 and top bearing plate 17 and carries thereon a rotor designated generally by the numeral 21. The bottom cover 11 is bored at 22 to allow the shaft 20 to pass therethrough, and is counterbored at 23 to receive the outer race 24 of a radial ball bearing assembly, the inner race 25 being suitably secured to the shaft 20 in known manner as by a push or slip fit. A thin flexible washer 28 of bronze or other suitable material is positioned in the counterbore 23 between the end of the bore and the outer race 24, the inner periphery of the washer resting against the inner race 25 to prevent entrance of foreign material into the ball bearing assembly. The bottom ball bearing assembly is protected from the exterior by a cover plate 26 bolted to the bottom cover 11 by bolts 27, or secured thereto in any other suitable manner, and the bottom plate 26 overlies the outer race 24 and serves to clamp the outer race against the washer 28 and holds it in position. The top bearing plate 17 is bored at 30 to allow the shaft 20 to pass therethrough, and a bushing 31 is located on the reduced end 32 of the shaft 20. The bushing 31 receives the inner race 33 of the upper radial ball bearing assembly, the outer race 34 thereof being received in a suitable counterbore 36 in the top bearing plate 17. An annular plate 37 secured to the top plate 17 by screws 38 or other suitable means keeps the upper ball bearing assembly in position, and by means of shims 39 under the outer race the ball bearing assembly may be accurately raised or lowered to predetermined position, as required.

A gear 29 is keyed on the end 32 of the shaft and a pair of nuts 35 threaded on the shaft hold the gear 29 and bushing 31 in assembled position.

The rotor 21 comprises a shell of generally cylindrical shape having an upper inturned flange 41 and a lower inturned flange 42. The upper rotor head 43 has cut out portions to provide spokes 44 which have ribs 45 on their under sides. The ribs 45 have accurately machined ends 46 which abut the inturned upper flange 41 of the rotor shell, and the upper head is held in position by suitable screws and dowels passing through holes 47 and 48 respectively in the head into holes 49 and 51 respectively in flange 41. Threaded holes 50 are provided to receive a jack screw to enable easy removal of the head. The head 43 has a central hub 52 which is bored at 53 to receive the shaft 20. The bottom head 54 similarly is cut out to provide spokes having ribs 55 and 56, the inner ribs having accurately machined shoulders 57 which abut the inner edge of the lower inturned flange 42, and the lower head is secured in position similar to the upper head 43. The bottom head also has a bored central hub 58. The rotor 21 is held in position on the shaft 20 by a pin 59 passing through aligned bores in the hub 58 and shaft 20. The outer surface of the rotor forms a close fit with a running clearance with the inner wall 9 of the division plate, as shown in the drawing on an exaggerated scale, and the bottom plate 11 has a cylindrical bore 60 which provides a close fit with a running clearance with the lower end of the rotor and bottom cover 54. The space between the cylindrical wall 2 of the casing and the surface of rotor 21 provides an annular measuring chamber 62, the bottom of which is defined by flat portion 63 of the bottom plate 11, and the top of the measuring chamber 62 is defined by the bottom surface 64 of an extension of top bearing plate 17 held against the top of division plate 5. The cylindrical wall 2 may have depressed portions 65 terminating in rounded shoulders so as to prevent foreign matter from jamming between the end of the blade and the chamber wall.

The outer wall of the rotor 21 has a plurality of recesses 68 therein. As shown, there are preferably four such recesses disposed equidistantly and diametrically opposite, although any desired number may be employed equally spaced apart. If an odd number of recesses 68 are employed they will be spaced apart substantially equidistantly although not diametrically opposite as where an even number are employed. The top and bottom heads 43 and 54 respectively have bores adjacent their peripheries as indicated at 69 and 70 in which are located the flanged bushings 71 and 72. Since each of the assemblies in recesses 68 are identical, only one will be described in detail. A wing shaft 73 has reduced ends 74 and 75 rotatably journalled in the bushings 71 and 72 and has a flat cut out portion 76 terminating at one end in an abutment 77. The cylindrical shoulder of recess 68 forms a close running fit with a slight clearance with the wing shaft 73, this clearance being shown on an exaggerated scale in the drawing. A vane 79 is held in position on the flat portion 76 against the abutment 77 by rivets 81' or other suitable means. Thus, when the shaft 73 is rotated or rocked the vane 79 will likewise be rocked about the shaft 73 as a pivot into and out of the annular measuring chamber 62.

The upper end 74 of the shaft 73 has a further reduced portion 81 having partial worm teeth 82 cut therein, and inturned rocker arms 83 have a split hub 84 at one end which is bored as indicated at 85 and receives a screw 86 and nut 87 by which the split hub is clamped about the reduced portion 81 of the shaft. The threads of screw 86 engage the worm teeth 82 on shaft end 81, and by rotating screw 86 the angular position of wing 79 on shaft 73 may be adjusted with relation to arm 83. The arms 83 extend inwardly and at their inner ends are bored at 88 and receive a stub 89 carrying a ball bearing roller 91 thereon and held in position by the nut 93. A headed extension 95 of the shaft 89 has one loop 96 of a spring 97 secured thereto, the other loop 98 of the spring passing through a suitable aperture 99 in an equalizer ring 101. The rollers 91 abut the periphery of the cam 102 which is secured to a hub 103 at the top plate 17 by screws or other suitable means, the hub 103 having a recessed portion 103' to conserve metal.

The operation of the apparatus now will be described, the operation of a single blade being selected for the purpose of illustration. Fluid enters the inlet 3 into the measuring chamber 62 and moves around this chamber until it engages a blade 79 in its path. As shown, a blade 79 is extended into the annular measuring chamber 62 and in its extreme outermost position its end has a slight clearance with the inner cylindrical wall 2, and as the fluid engages the extended blade it causes the rotor to rotate. The blade 79 is held in extended position during the rotor driving portion of its operation by the fluid pressure and the force of springs 97, engagement of ball bearing roller 91 on arm 83 against the concentric cam portion 104 preventing the blade from pivoting outwardly too far and determining the clearance between the blade end and wall 2. The cam is shaped so that one vane 79 maintains this outward position until the next vane 79 is in turn brought into extended position. The cam has an advancing edge 105 which forces the blade 79 to retracted position as the outlet 4 is reached and is held in this position by concentric portion 106 of the cam and rides past the segmental division plate 5 to the inlet 3. When the inlet is reached, the receding portion 107 of the cam allows the springs 97 and fluid pressure to again extend the blade into rotor driving position. This cycle of operation is repeated by each blade in sequence as long as fluid is supplied to the meter.

The shafts 73 upon which the vanes 79 are mounted form a close fit with a slight running clearance against the respective cylindrical portions or shoulders of the recesses 68. The pivoted vanes 79 have a close fit with a running clearance with the bottom 63 and top 64 of the measuring chamber and with the cylindrical wall 2 thereof when in extended position, and the rotor 21 has a similar small clearance with the division plate 5 so that frictional resistance to turning thus is reduced wherever possible by providing running clearances for the meter. The clearances provided are on the order of a few thousandths of an inch which is sufficient to eliminate frictional resistance to turning and provide a practical fluid seal between the respective parts. As an example, a clearance of one to three-thousandths of an inch may be provided. Also, it will be apparent that while I have shown the meter with its central shaft in the vertical position, it will be understood that the meter may be used in the horizontal or inclined position.

As the invention may be embodied in other specific forms without departing from the spirit or essential characteristics thereof, the present preferred embodiment is therefore to be considered as illustrative rather than restrictive of the invention.

What is claimed and desired to be secured by United States Letters Patent is:

1. In a fluid meter, a casing providing a cylindrical measuring chamber, a division plate in said measuring chamber separating inlet and outlet, inlet and outlet openings on opposite sides of said division plate, a rotor journalled in the casing spaced from the walls thereof, threaded journals in said rotor, blades mounted on said journals in said rotor for pivotal operation and adapted to extend into the measuring chamber, extensions on said journals, said extensions cooperating with stationary means for retracting and extending said blades, said extensions being secured to said journals by means of a clamping fit, and threaded bolts which cooperate with said threads on said journals to provide a gradual angular adjustment of said extensions with respect to said blades.

2. In a fluid flow mechanism, a casing having a substantially cylindrical bore and inlet and outlet connections thereto, a division plate in the casing between the inlet and outlet connections, a rotor journalled in said casing providing a measuring chamber with the casing, vanes pivotally secured in and carried by said rotor providing clearances with the end walls of the measuring chamber in extended position, a fixed cam, equalizing means yieldably interconnecting said vanes, and means carried by said vanes co-operating with said cam, said cam being shaped to retract said vanes to pass said division plate with a running clearance and to limit extension of said vanes as the rotor rotates so as to provide running clearances between the edges of the vanes and the walls of said chamber.

3. In a fluid meter, a casing, a rotor journalled within said casing and spaced from the walls of the casing to provide a measuring chamber, a plurality of longitudinal vane shafts pivotally supported on said rotor, vanes on said shafts adapted to be extended into said chamber, stationary cam means, a cam follower arm rigid with each of said shafts, a separate resilient means for retaining each of said arms in engagement with said cam means, said cam means and resilient means cooperating to control the angular position of said vanes and limit extension of said vanes so as to provide running clearances between the edges of said vanes and the walls of said chamber, and a member interconnecting said resilient means for equalizing the forces exerted by said resilient means.

4. In a fluid meter, a casing, a rotor journalled within said casing spaced from the walls thereof to provide a measuring chamber, a plurality of longitudinal vane shafts pivotally supported on said rotor, vanes on said shafts adapted to be extended into said chamber, stationary cam means, an arm rigid with each of said shafts, a spring for maintaining each arm in contact with said cam means, said cam means and springs cooperating to control the angular position of said vanes and limit extension of said vanes so as to provide running clearances between the edges of said vanes and the walls of said chamber, and an equalizer ring providing a common anchor for said springs.

5. In a fluid meter, a casing and a rotor journalled within the casing, the walls of said casing and rotor being spaced to define a measuring chamber, a vane shaft pivotally supported on said rotor and an extension on said vane shaft, a vane on said shaft adapted to extend into said chamber a stationary cam on said casing, a cam follower arm extending from said cam to said extension, means comprising a fastening element for securing said arm rigidly to said shaft, and cooperating formations on said extension and element for adjusting said shaft about its axis upon actuation of said element to determine the running clearance between the edge of said blade and the walls of said casing.

WALTER H. MARSH.